US010290989B2

(12) United States Patent
Particka et al.

(10) Patent No.: US 10,290,989 B2
(45) Date of Patent: May 14, 2019

(54) QUICK RELEASE FEED GUIDE AND TOOL SUPPORT FOR TERMINAL APPLICATOR

(71) Applicant: Odyssey Tool, L. L. C., Clinton Township, MI (US)

(72) Inventors: Douglas A. Particka, Snover, MI (US); George J. Tilli, Clinton Township, MI (US)

(73) Assignee: Odyssey Tool, LLC, Clinton Township, MI (US)

( * ) Notice: Subject to any disclaimer, the term of this patent is extended or adjusted under 35 U.S.C. 154(b) by 179 days.

(21) Appl. No.: 15/438,091

(22) Filed: Feb. 21, 2017

(65) Prior Publication Data

US 2017/0162995 A1 Jun. 8, 2017

Related U.S. Application Data

(62) Division of application No. 14/623,757, filed on Feb. 17, 2015, now Pat. No. 9,583,905, which is a division of application No. 14/037,716, filed on Sep. 26, 2013, now Pat. No. 8,973,256, which is a division of application No. 12/913,447, filed on Oct. 27, 2010, now Pat. No. 8,544,166.

(60) Provisional application No. 61/280,141, filed on Oct. 30, 2009.

(51) Int. Cl.
*B23P 19/00* (2006.01)
*H01R 43/042* (2006.01)
*H01R 43/048* (2006.01)

(52) U.S. Cl.
CPC ........ *H01R 43/048* (2013.01); *Y10T 29/5193* (2015.01); *Y10T 29/53226* (2015.01); *Y10T 29/53235* (2015.01); *Y10T 29/53265* (2015.01)

(58) Field of Classification Search
CPC ........ B26D 1/04; H01R 43/01; H01R 43/048; H01R 43/0585; H01R 43/055; Y10T 29/53235; Y10T 29/53226; Y10T 29/53265
USPC ....... 29/753, 33 M, 712, 748, 751, 755, 760, 29/761, 788, 861, 863
See application file for complete search history.

(56) References Cited

U.S. PATENT DOCUMENTS 6,327,775 B1 * 12/2001 Oishi .................. H01R 43/055 29/33 M
6,530,257 B2 * 3/2003 Ooji ..................... H01R 43/055 29/753

* cited by examiner

*Primary Examiner* — Thiem D Phan
(74) *Attorney, Agent, or Firm* — Vivacqua Law, PLLC; Thomas J. Krul; Raymond J. Vivacqua

(57) ABSTRACT

An electrical terminal applicator system includes a die connected to a press. A one-piece member including a stock guide portion is homogeneously connected to a tool receiving portion. The one-piece member is releasably secured to the die using a first fastener. A male member extends from the one-piece member, and a female slot is created in the die slidably receiving the male member to permit the one-piece member to be horizontally positioned on the die prior to securing the one-piece member using the single fastener. A tool assembly having a tool mount block is movable to a desired position. The tool assembly is releasably secured to the tool receiving portion using a second fastener after positioning the tool assembly in the desired position.

8 Claims, 16 Drawing Sheets

QUICK RELEASE FEED GUIDE AND TOOL SUPPORT FOR TERMINAL APPLICATOR

CROSS-REFERENCE TO RELATED APPLICATIONS

This application is a divisional of U.S. patent application Ser. No. 14/623,757, filed Feb. 17, 2015, presently allowed, which is a divisional application of U.S. patent application Ser. No. 14/037,716, filed Sep. 26, 2013, which issued as U.S. Pat. No. 8,973,256 on Mar. 10, 2015, which is a divisional application of U.S. patent application Ser. No. 12/913,447, filed Oct. 27, 2010, which issued as U.S. Pat. No. 8,544,166 on Oct. 1, 2013, which claims the benefit of U.S. Provisional Application No. 61/280,141, filed on Oct. 30, 2009. The entire disclosures of the above applications are incorporated herein by reference.

FIELD

The present disclosure relates to terminal feed and tool support components for electrical terminal applicators.

BACKGROUND

This section provides background information related to the present disclosure which is not necessarily prior art.

Dies connected to and reciprocated by a press are commonly used to attach an electrical terminal to a wire by crimping the terminal to both the insulation and a stripped portion of the wire. Electrical terminals are commonly provided on a reel attached to a tape or carrier strip which positions successive terminals at a predefined, equal spacing. The die commonly includes a feed platen or plate which receives the carrier strip and aligns each terminal with a tool portion. The tool portion commonly includes an insulation stripper, first and second crimp tools, and first and second anvils each vertically aligned under one of the first or second crimp tools. An incremental terminal feeding member such as a feed finger can also be used to incrementally feed a next-in-line terminal from the feed platen to the tool portion with each stroke of a ram provided with the press.

A first connection is commonly created by the first crimp tool and first anvil by crimping the terminal and a stripped wire portion. A second connection is created by the second crimp tool and second anvil by crimping tabs of the terminal about an insulated portion of the wire proximate to the stripped wire portion. Each type and size of terminal commonly requires a separate feed platen or adjustment of an alignment portion of the feed platen to properly align the terminals with the tool portion. Each type and size of terminal also requires a different tool portion. To eliminate the need to separately install a new feed platen, and tool portion, and then align and test these components, terminal installers commonly remove and replace the entire die, feed platen, and tool portion together when changing an assembly line from a first to a second size or type of terminal. This requires not only multiple feed platens and tool portions, but also multiple dies, and therefore increased hardware costs for the multiple dies and die attached components. Each die change, or combined feed platen adjustment and tool portion change can require approximately 30 to 60 minutes for a machine operator to perform, not including fine-adjustment time required to ensure proper alignment between the crimp tools and anvils. This down-time is non productive and therefore decreases efficiency while increasing per-part costs.

SUMMARY

This section provides a general summary of the disclosure, and is not a comprehensive disclosure of its full scope or all of its features.

According to several embodiments of the present disclosure, an electrical terminal applicator system include a die; a one-piece member including a stock guide portion fixed directly to a tool receiving portion; and a single fastener releasably connecting the one-piece member to the die.

According to further embodiments, an electrical terminal applicator system includes a die connected to a press. A one-piece member includes a stock guide portion homogeneously connected to a tool receiving portion. The one-piece member is releasably secured to the die using only a single fastener. A male member extends from either one of the one-piece member or the die, and a female slot is created in the other one of the one-piece member or the die slidably receiving the male member to permit the one-piece member to be horizontally positioned on the die prior to securing the one-piece member using the single fastener.

According to still further embodiments, an electrical terminal applicator system includes a die connected to a press. A one-piece member having a tool holder portion is homogeneously connected to a stock guide portion. A guide rail is oriented on a first axis and homogeneously connected to a stock receiving surface of the stock guide portion. A tool assembly is slidably received on the tool holder portion for sliding motion on a second axis oriented transverse to the first axis. A male key homogeneously extending from the tool receiving portion is slidably received in a key slot created in the die, the male key permitting the one-piece member together with the tool assembly to be translated parallel with the second axis independently of the tool assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
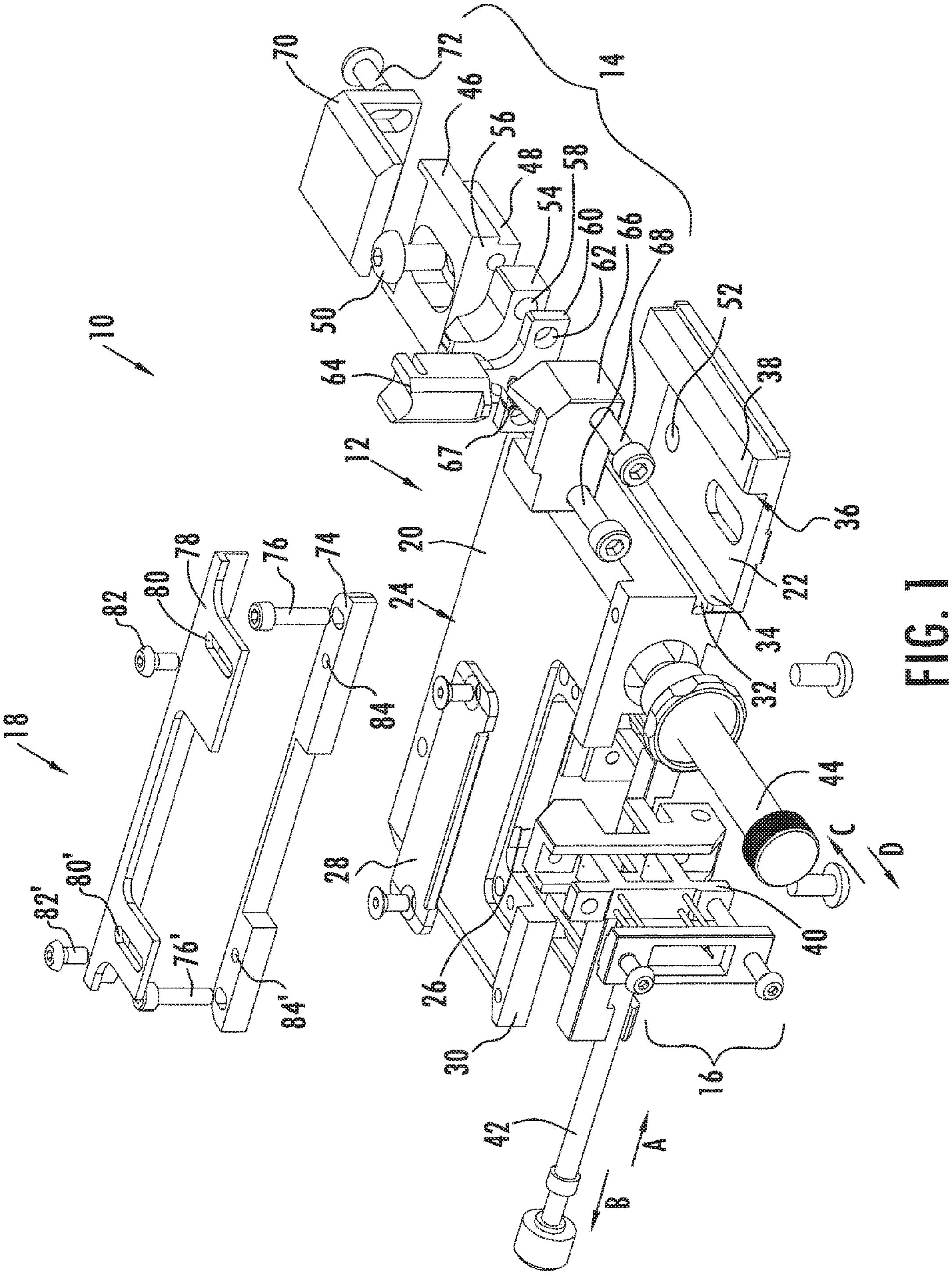
FIG. 1 is a front left perspective assembly view of a feed guide and tool support assembly having a one-piece member of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a feed guide and tool support assembly 10 includes a one-piece member 12 which can have a releasably connected tool assembly 14, an adaptor portion 16, and a releasable rail portion 18. One-piece member 12 includes a stock guide portion 20 fixed directly to a tool receiving portion 22 such as by fastening, non-releasable connection, or being together created as a homogeneous member. The stock guide portion 20 includes a plate or stock guide platen 24 which defines a substantially planar surface. A platen opening 26 is created in stock guide platen 24 to permit access to adaptor portion 16. A cover plate 28 can be fastenably connected to stock guide portion 20 to cover platen opening 26. A guide rail 30 can be fixed directly to, or homogeneously or non-releasably connected to and extend upwardly from stock guide platen 24.

Stock guide portion 20 can be homogeneously connected to tool receiving portion 22 at a connecting portion 32. Connecting portion 32 provides a first alignment surface 34. An opposed second alignment surface 36 is spaced from and oriented parallel to first alignment surface 34. Second alignment surface 36 is created in a containment wall 38.

Figure 11:
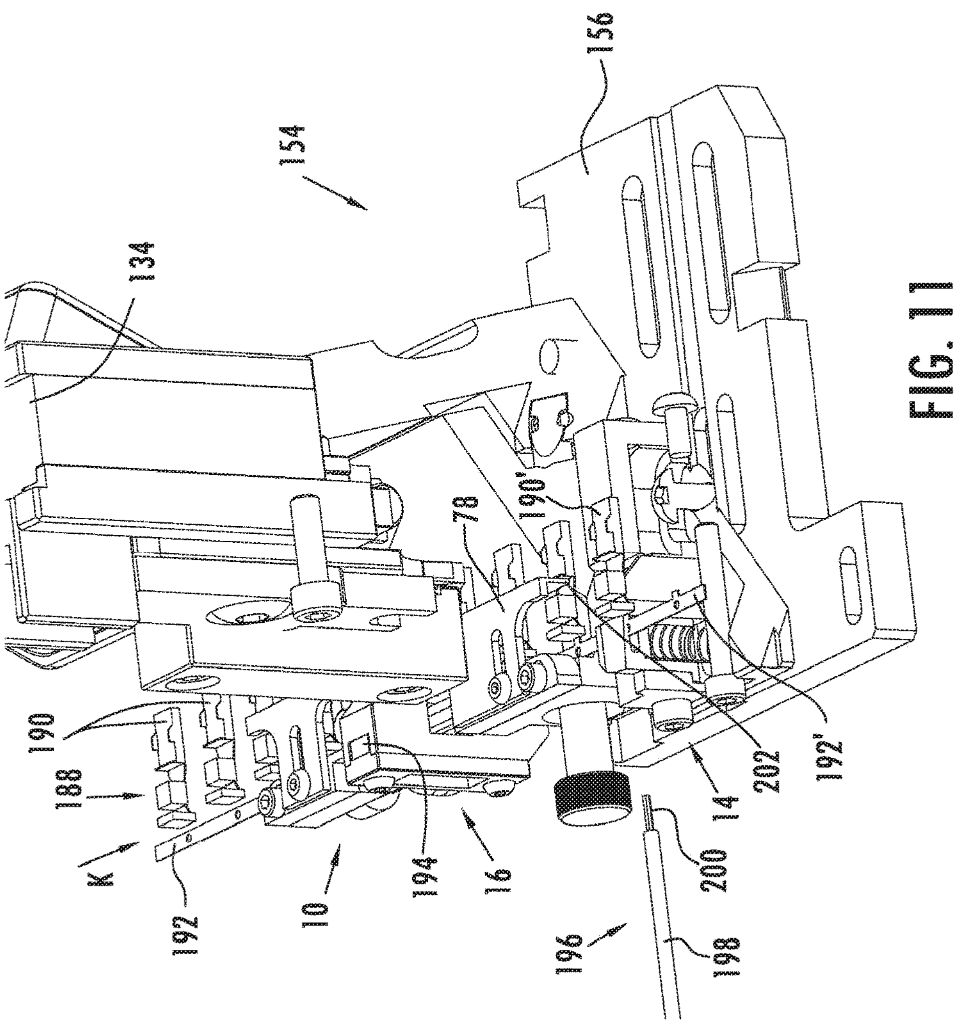
FIG. 11 is a left front perspective view of an assembly of an feed guide and tool support assembly on a die during operation.

Adaptor portion 16 includes a sensor mounting portion 40 adapted to releasably receive a sensor such as an optical sensor which will be further described in reference to FIG. 11. An adjustment stud 42 is partially received through adaptor portion 16 which permits the adaptor portion 16 to be moved in a first direction "A" and in an opposite second direction "B". An adjustment device 44 can also be provided with feed guide and tool support assembly 10 which can be axially rotated to horizontally move one-piece member 12 for fine horizontal adjustment in either of an inward horizontal direction "C" or an outward horizontal direction "D" by opposite axial rotation of adjustment device 44.

According to several embodiments tool assembly 14 can include a tool mount block 46 which has opposed parallel faces 48, 48' (only parallel face 48 is visible in this view) which slidingly contact second alignment surface 36 and first alignment surface 34 respectively. When a desired position of tool assembly 14 with respect to tool receiving portion 22 is reached, a block fastener 50 inserted through tool mount block 46 is received in a threaded aperture 52 of tool receiving portion 22 to releasably fix a position of tool mount block 46. Several tool items can be releasably fastened to tool mount block 46, including a conductor anvil 54 positioned in contact with an abutment surface 56 of tool mount block 46. Conductor anvil 54 has a plurality of through apertures 58. An insulation anvil 60 is positioned in abutment with conductor anvil 54 and includes a plurality of apertures 62 each coaxially aligned with individual ones of the through apertures 58. A cutter 64 is slidably received in a cutter retainer 66 and biased by a cutter spring 67. Cutter retainer 66 is positioned in abutment with insulation anvil 60 and a plurality of tool assembly fasteners 68 are inserted sequentially through cutter retainer 66, through apertures 62 of insulation anvil 60, and through apertures 58 of conductor anvil 54 to releasably fasten these components to tool mount block 46. On an opposite side of tool mount block 46 with respect to conductor anvil 54, a terminal straightener 70 is fastenably connected using a plurality of fasteners 72. All of the components of tool assembly 14 which are connected to mount tool block 46 are fastened to tool receiving portion 22 using block fastener 50 such that only a single fastener is required to remove or install tool assembly 14. Tool assembly 14 when fastenably connected to tool receiving portion 22 can also be retained and the entire assembly of tool assembly 14 and one-piece member 12 can be installed or removed using only a single fastener 155, shown and described in reference to FIGS. 8-10 and 14.

A spacer 74 can be fastenably connected to stock guide platen 24 of stock guide portion 20 using a plurality of spacer fasteners 76, 76'. A rail 78 is releasably fastened to spacer 74 such that rail 78 can be adjustably positioned with respect to homogeneous guide rail 30. To permit horizontal adjustment of rail 78, elongated apertures 80, 80' each receive a rail fastener 82, 82' for threaded engagement within a threaded aperture 84, 84' of spacer 74. All of the components depicted in FIG. 1 defining feed guide and tool support assembly 10 can be installed or removed as a single assembly by engagement or release of only single fastener 155 (shown and described in reference to FIGS. 8-10 and 14). According to further embodiments, one-piece member 12 can have tool receiving portion 22 and guide rail 30 non-releasably connected to stock guide portion 20.

Figure 2:
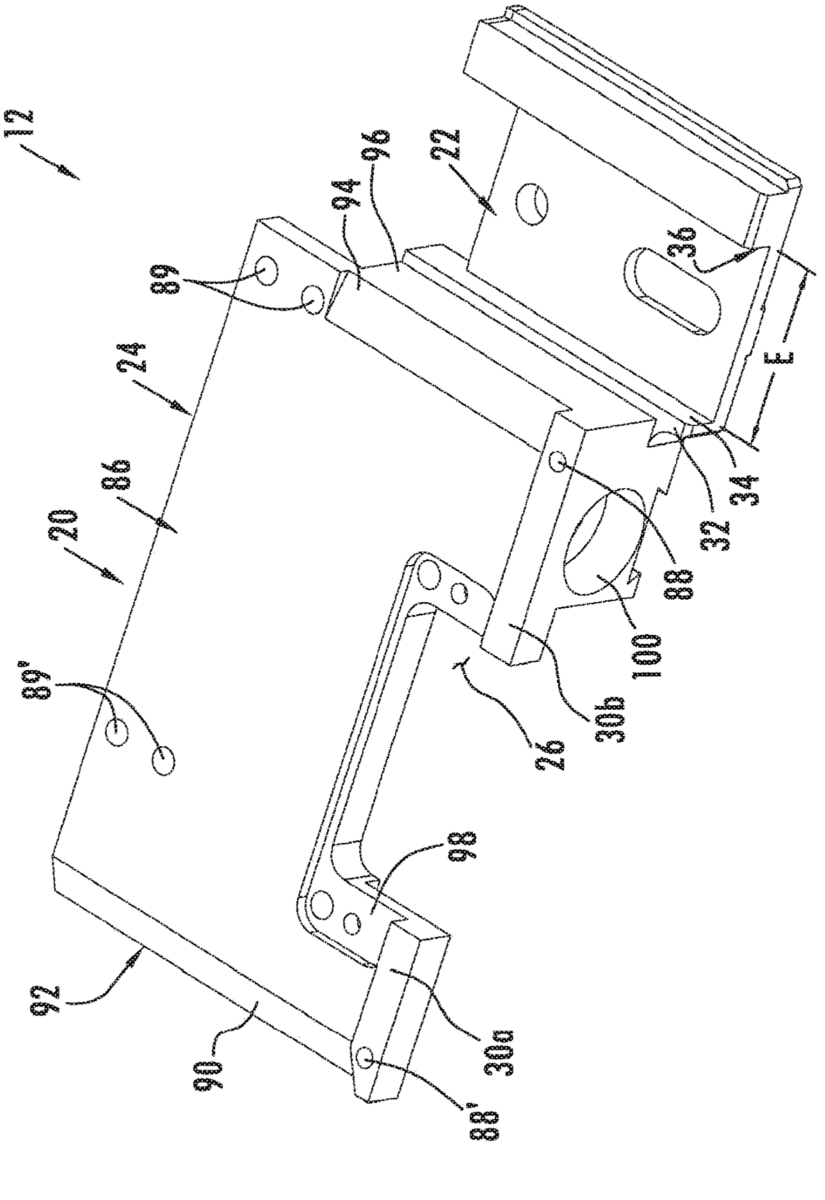
FIG. 2 is a top left perspective view of the one-piece member of FIG. 1.

Referring to FIG. 2 and again to FIG. 1, further features of one-piece member 12 include a planar surface 86 of stock guide platen 24 having guide rail 30 homogeneously extending therefrom. A plurality of fastener engagement apertures 88, 88' are created in guide rail 30, and a plurality of fastener engagement apertures 89 are created in planar surface 86 for connection of terminal guide members and the like. A first chamfer 90 is created at a terminal feed end 92 which is oppositely positioned with respect to a second chamfer 94 created at a terminal delivery end 96. A counterbore portion 98 is created at platen opening 26 such that cover plate 28 fully seats within counterbore portion 98 aligning a surface of cover plate 28 flush with planar surface 86. The homogeneous guide rail 30 is separated into a first guide rail portion 30*a* and a second guide rail portion 30*b* on opposite sides of platen opening 26. A clearance aperture 100 is created to receive adjustment device 44. Connecting portion 32 homogeneously connects stock guide portion 20 to tool receiving portion 22 proximate to terminal delivery end 96. A tool receiving opening width "E" is defined between first and second alignment surfaces 34, 36 which provide a sliding fit for opposed parallel faces 48, 48' of tool mount block 46.

Figure 3:
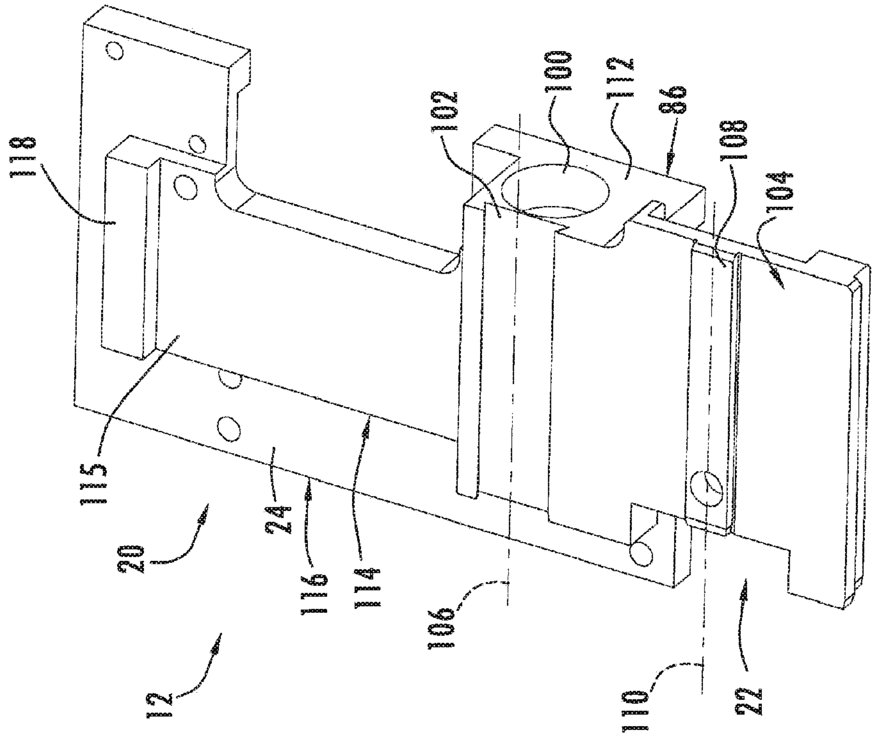
FIG. 3 is a bottom perspective view of the one-piece member of FIG. 2.

Referring to FIG. 3, a female slot 102 is created in a planar support surface 104 which is oppositely facing with respect planar surface 86. According to several embodiments female slot 102 can be a rectangular shaped slot or a dovetail shaped slot aligned on a slot longitudinal axis 106. A male key member 108 can extend away from planar support surface 104 and opposite to the configuration of female slot 102 with respect to planar support surface 104. Male key member 108 is axially aligned on a key member longitudinal axis 110 which is aligned parallel with slot longitudinal axis 106. Male key member 108 can have a rectangular shape or a dovetail shape to correspond to the shape of female slot 102. Guide rail 30 is homogeneously connected to stock guide platen 24 to permit machining or casting guide rail 30 transverse to both longitudinal axes 106 and 110 such that guide rail 30 is non-adjustable and therefore always oriented transverse to female slot 102 and male key member 108. Both the female slot 102 and clearance aperture 100 are created in an adjustment device receiving portion 112 of one-piece member 12. Male key member 108 extends away from planar support surface 104 of tool receiving portion 22. A rear facing reinforcement wall 114 of a raised reinforcement portion 115 is oriented parallel with but spatially separated from a rear facing platen face 116 of stock guide portion 20. A secondary support wall 118 extends below and away from raised reinforcement portion 115 to create a support surface for stock guide portion 20 in addition to planar support surface 104.

Referring to FIG. 4 and again to FIG. 1, a rear tool receiving portion face 120 of tool receiving portion 22 is recessed with respect to a wall end face 122 of containment wall 38. The rear tool receiving portion face 120 recess permits positioning terminal straightener 70 partially within the recess which prevents rotation of terminal straightener 70.

Referring to FIG. 5 and again to FIG. 1, tool receiving portion 22 includes a tool receiving portion surface 124 which is substantially planar and is oriented parallel with planar surface 86. Tool receiving portion surface 124 is positioned below planar surface 86 by a separation distance "F" which provides space for tool assembly 14 to be received and slidably engaged with tool receiving portion surface 124. A threaded aperture 126 is further created in adjustment device receiving portion 112 to threadably receive adjustment device 44.

Figures 4, 5, 6:
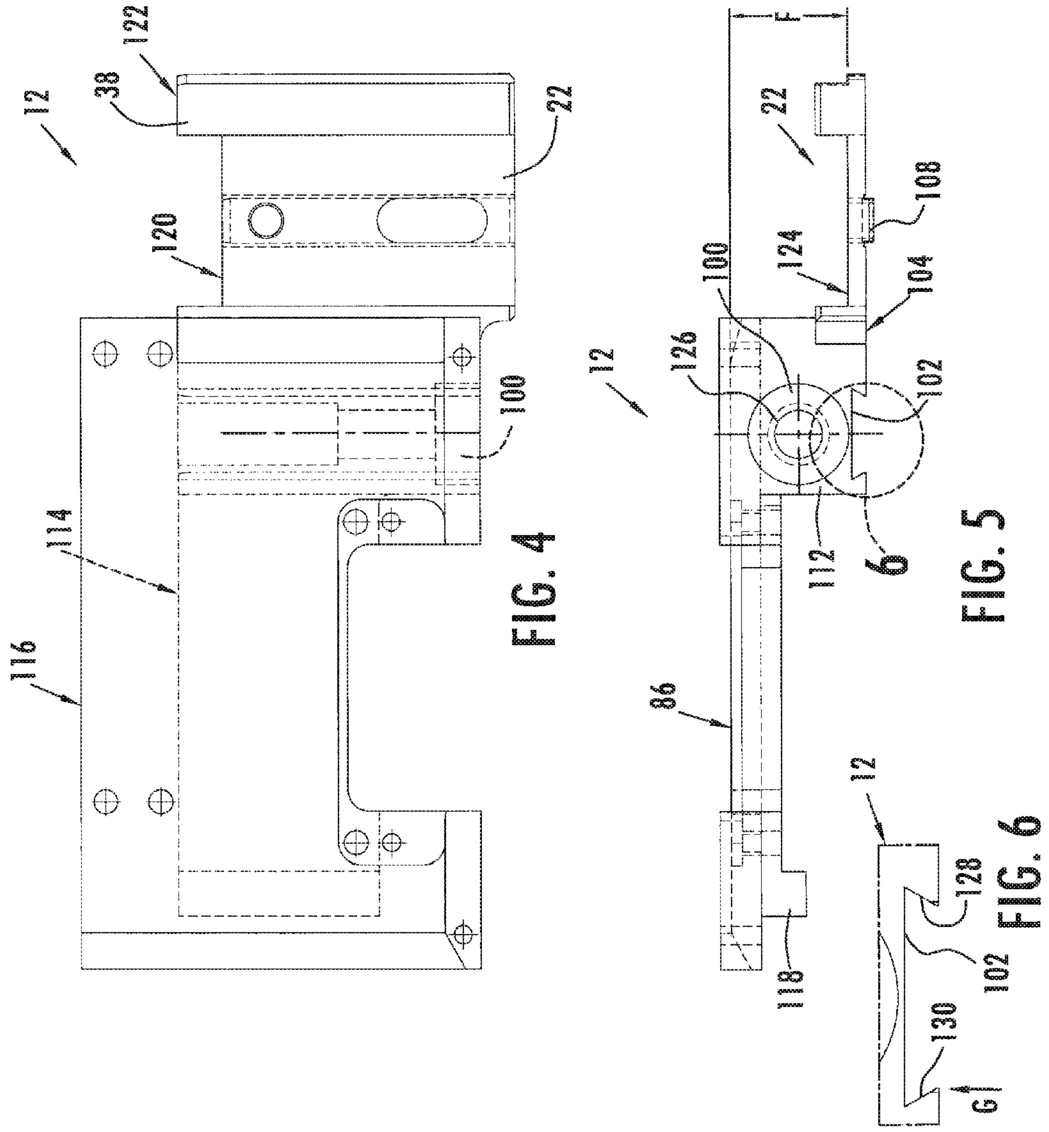
FIG. 4 is a top plan view of the one-piece member of FIG. 2.
FIG. 5 is a front end elevational view of the one-piece member of FIG. 2.
FIG. 6 is a front end elevational view of area 6 of FIG. 5.

Referring to FIG. 6, as previously noted female slot 102 can be created as a dovetail-shaped member. A first angled wall 128 is oppositely oriented with respect to an opposed second angled wall 130 to create the dovetail shape. By employing a dovetail-shaped female slot 102, one-piece member 12 is precluded from displacement in an upward direction "G" when a male dovetail shaped member (not shown in this view) is slidingly received within female slot 102.

Figure 7:
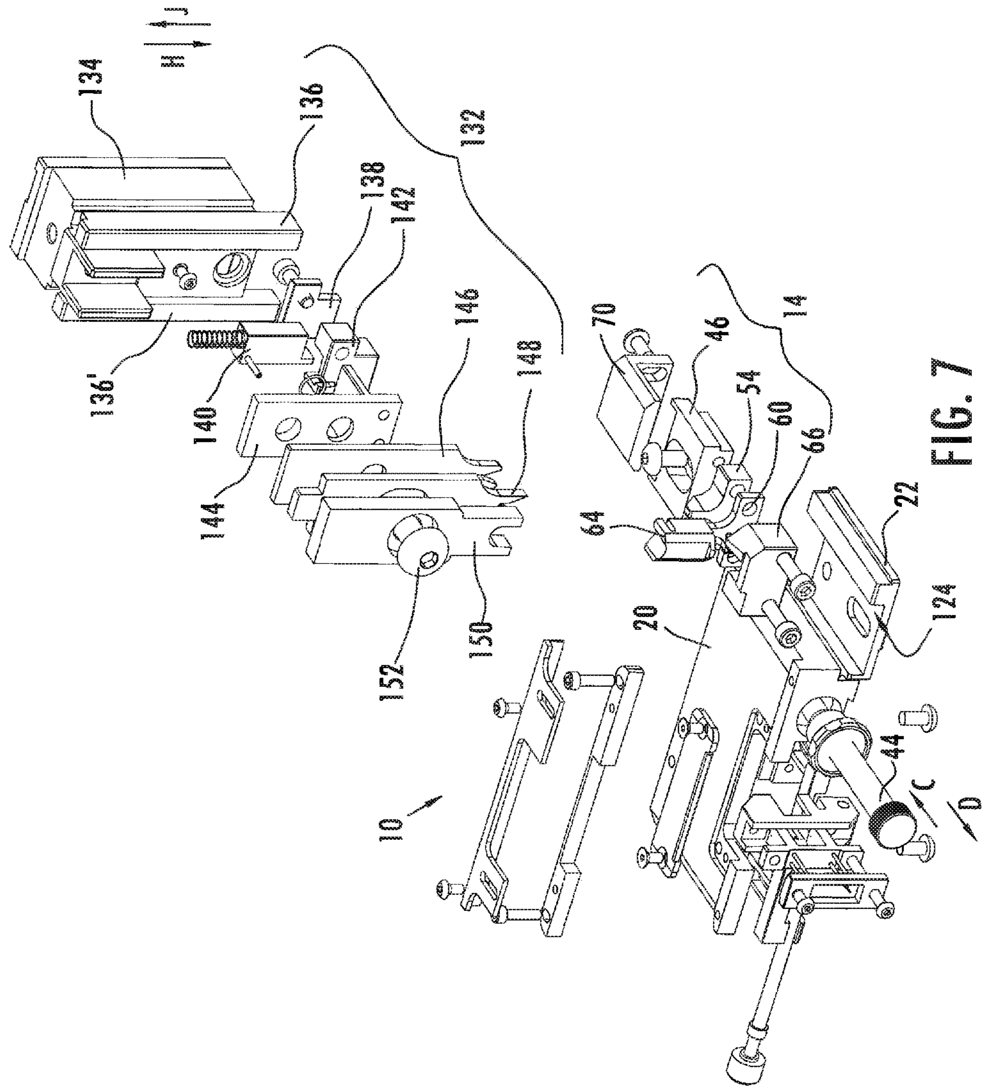
FIG. 7 is a front left perspective assembly view of the feed guide and tool support assembly of FIG. 1 and an upper tool assembly.

Referring to FIG. 7, feed guide and tool support assembly 10 can be used in conjunction with an upper tool assembly 132. According to several embodiments upper tool assembly 132 can include a ram 134 having first and second tool holders 136, 136'. First and second tool holders 136, 136' receive a cover 138, a pressure pad 140, and a pressure pad retainer 142. A punch retainer 144 is positioned outward of pressure pad retainer 142 and fastenably receives a conductor punch 146, an insulation punch 148, and a cutter actuator 150. A punch assembly fastener 152 is used to fastenably retain each of the cutter actuator 150, insulation punch 148, and conductor punch 146 to the punch retainer 144. As known in the art, conductor punch 146 contacting conductor anvil 54 deflects a portion of a terminal about an electrical wire or stranded wire. Insulation punch 148 deflects a second portion of the terminal about an insulated portion of the wire assembly. Finally, cutter actuator 150 in communication with cutter 64 is used to separate an individual terminal after the operations performed by the conductor punch 146 and insulation punch 148. Each of the components of upper tool assembly 132 move in unison with ram 134 which is displaceable in each of a punch actuation direction “H” and a punch return direction “J”. A single vertical displacement or operation of ram 134 includes motion in the punch actuation direction “H” followed by motion in the punch return direction “J”. Each single operation acts to complete assembly of a single terminal and wire combination. Multiple different configurations of components, cutters and/or punches can also be provided with upper tool assembly 132.

Figure 8:
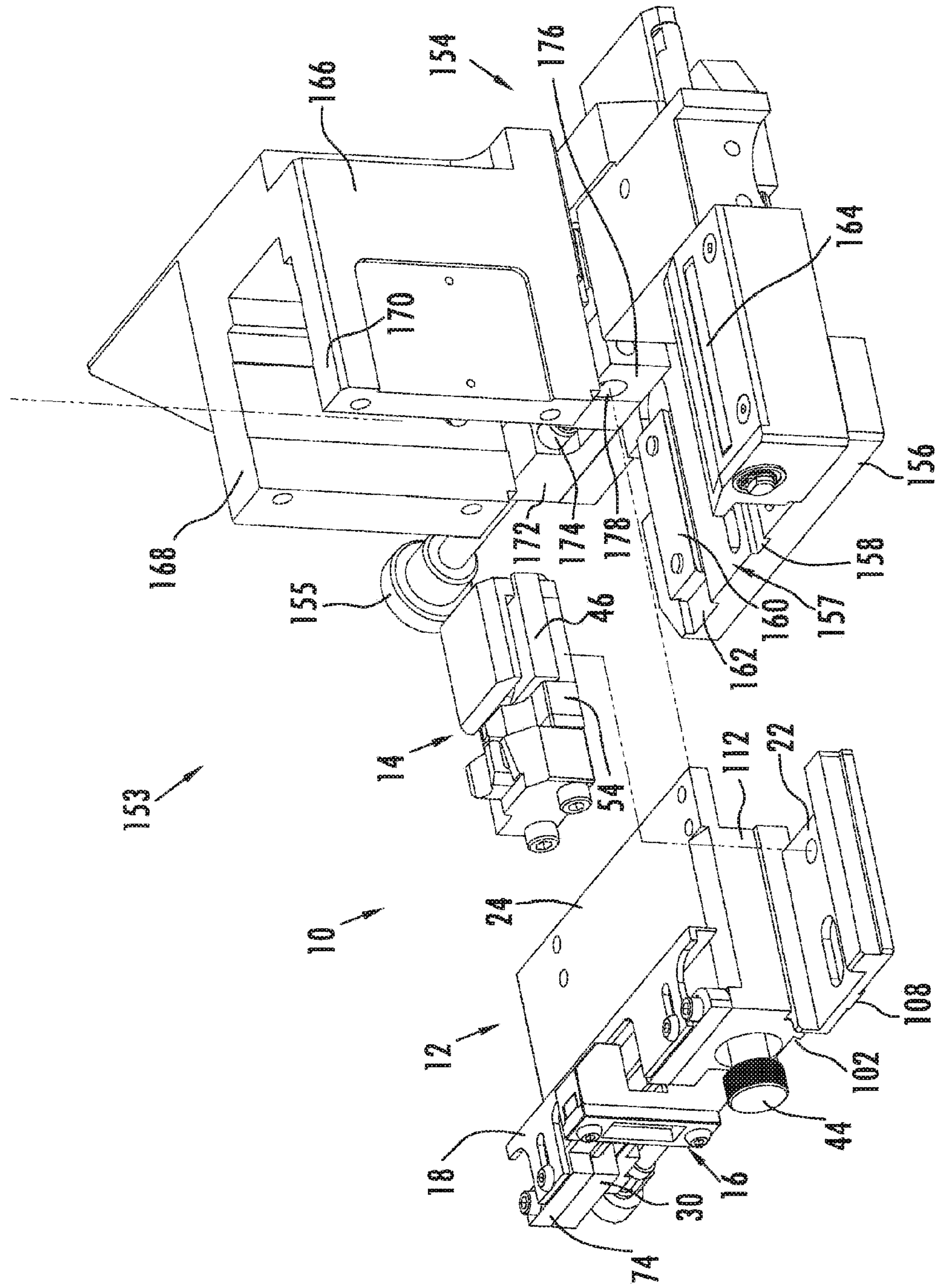
FIG. 8 is a left front perspective view of a feed guide and tool support assembly in position to be received by a die.

Referring to FIG. 8, according to several embodiments, the feed guide and tool support assembly 10 can be releasably connected to a die 154 for operation by a press (shown and described in reference to FIGS. 20, 21), forming an electrical terminal applicator system 153. One-piece member 12 includes stock guide portion 20 homogeneously connected to tool receiving portion 22. The single fastener 155 releasably connects the one-piece member 12 to the die 154. The feed guide and tool support assembly 10 can further include tool assembly 14 releasably secured to the tool receiving portion 22. The tool assembly 14 can include tool mount block 46 slidably positioned in and releasably fastened to the tool receiving portion 22, and at least one conductor anvil 54 releasably connected to the tool mount block 46 for crimping a terminal to a wire (shown and described in reference to FIG. 11).

FIG. 8 with continued reference to FIG. 7 further shows die 154 can include a die platen 156 having a plate portion 157 of the die 154 including a female slot 158 which slidably receives male key member 108 of tool receiving portion 22. A rectangular shaped portion of a male dovetail member 160 can be slidably received in a female slot 162 created in die platen 156 and fastenably connected to die platen 156 to fix its position. The dovetail portion of male dovetail member 160 is matingly received in female dovetail slot 102 of adjustment device receiving portion 112. An off-load alignment member 164 horizontally aligned with stock guide platen 24 provides horizontal support for completed wire/terminal components exiting feed guide and tool support assembly 10. A ram alignment member 166 slidably receives ram 134 between opposed first and second alignment walls 168, 170. A first apertured block 172 is connected to die platen 156 and threadably receives a threaded body portion 174 of single fastener 155. A second apertured block 176 connected to die platen 156 provides an alignment aperture 178 which receives an engagement end (not shown in this view) of adjustment device 44.

Figure 9:
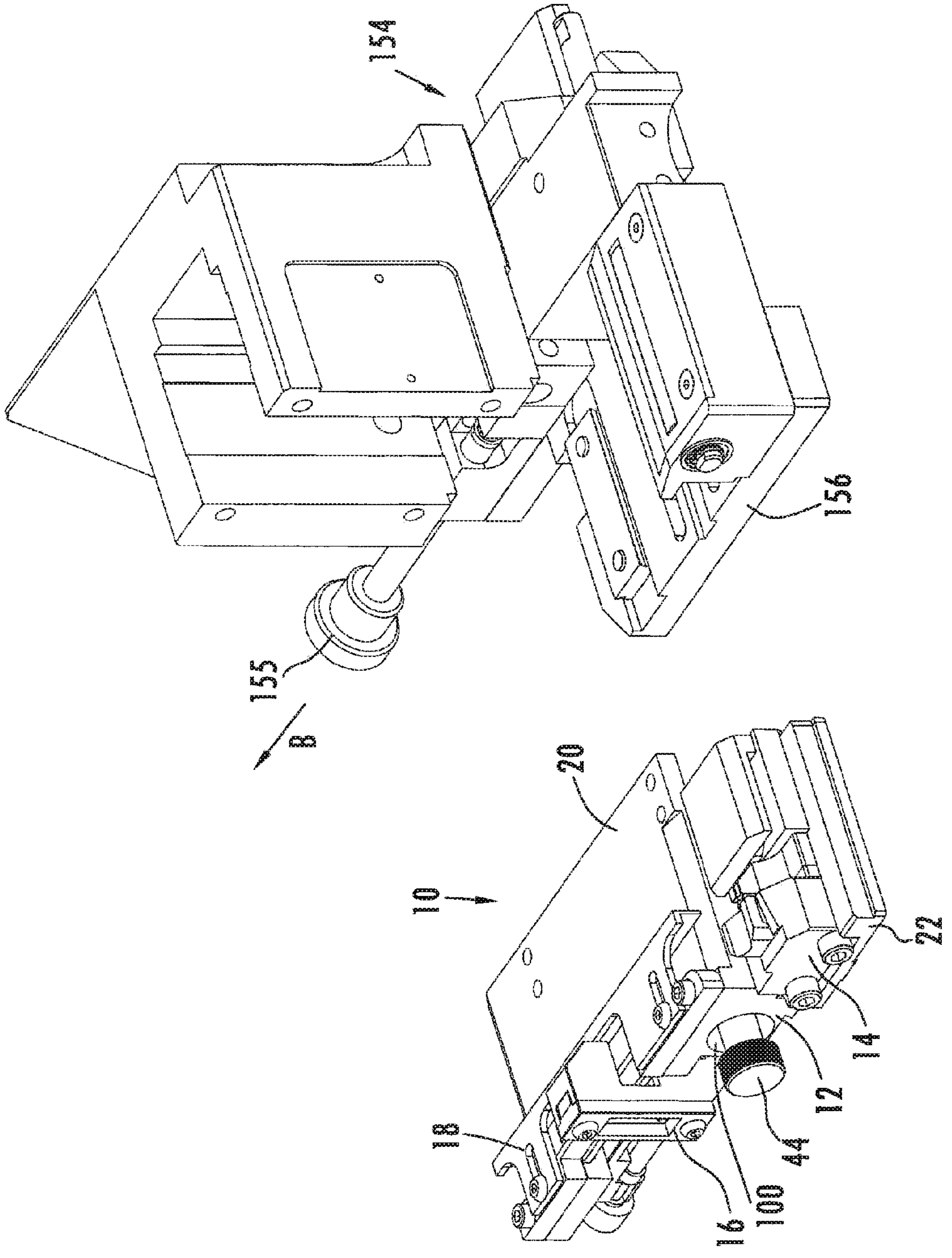
FIG. 9 is a left front perspective view of a feed guide and tool support assembly after removal from a die.

Referring to FIG. 9, with single fastener 155 retracted in the pin release or second direction “B”, die platen 156 of die 154 is ready to slidably receive feed guide and tool support assembly 10. Feed guide and tool support assembly 10 can be releasably connected to or released from engagement with die 154 by operation of only single fastener 155. Feed guide and tool support assembly 10 can be completely assembled as shown to include one-piece member 12 having tool assembly 14 fastenably connected to tool receiving portion 22, and both adaptor portion 16 and releasable rail portion 18 fastenably connected to one-piece member 12, and further having stock guide portion 20 homogeneously connected to tool receiving portion 22. Adjustment device 44 can also be included with feed guide and tool support assembly 10 by positioning adjustment device 44 in clearance aperture 100 of one-piece member 12.

Figure 10:
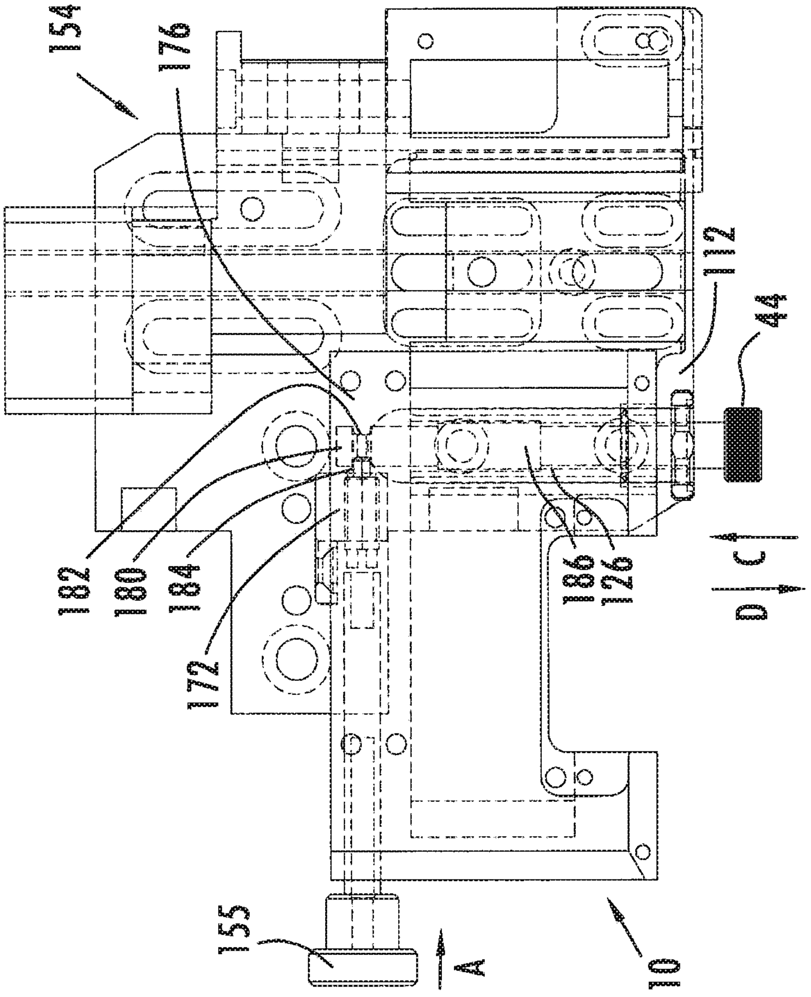
FIG. 10 is a top plan view of a feed guide and tool support assembly in an installed position on a die.

Referring to FIG. 10, feed guide and tool support assembly 10 is shown in an installed position on die 154 and single fastener 155 is inserted in the pin engagement or first direction “A” to retain feed guide and tool support assembly 10 in position. Adjustment device 44 is fully extended into second apertured block 176 until a terminal head 180 and a reduced diameter portion 182 of adjustment device 44 are aligned as shown. Single fastener 155 is fully inserted in the pin engagement direction “A” until a male extending pin 184 is received in reduced diameter portion 182. Male extending pin 184 thereafter prevents release of adjustment device 44 and feed guide and tool support assembly 10 by contact between male extending pin 184 and terminal head 180. Subsequent axial rotation of adjustment device 44 engages a threaded portion 186 of adjustment device 44 with threaded aperture 126 of adjustment device receiving portion 112 to horizontally adjust a position of feed guide and tool support assembly 10 with respect to die 154 in either the inward horizontal direction “C” or the outward horizontal direction “D”.

Referring to FIG. 11, each feed guide and tool support assembly 10 when releasably connected to die platen 156 of die 154 can receive at least one size of terminal holder strip 188. Terminal holder strip 188 includes a plurality of electrical terminals 190 connected to a carrier strip 192. Terminal holder strip 188 is fed in a terminal feed direction “K”. Each electrical terminal 190 can be identified as it passes a sensor 194, such as an optical sensor, mounted to adaptor portion 16, to initiate action of ram 134. Prior to initiation of a next ram cycle, a wire strip 196 having an insulation portion 198 and a stripped wire portion 200 is inserted into a next electrical terminal 190'. Each ram cycle (a downward and an opposite upward motion of ram 134) engages wire strip 196 to the next electrical terminal 190' and separates an assembly of the wire strip 196 and next electrical terminal 190' from a carrier strip portion 192'. According to several embodiments, a flange end 202 of rail 78 can be provided to help guide the plurality of electrical terminals 190.

Figure 12:
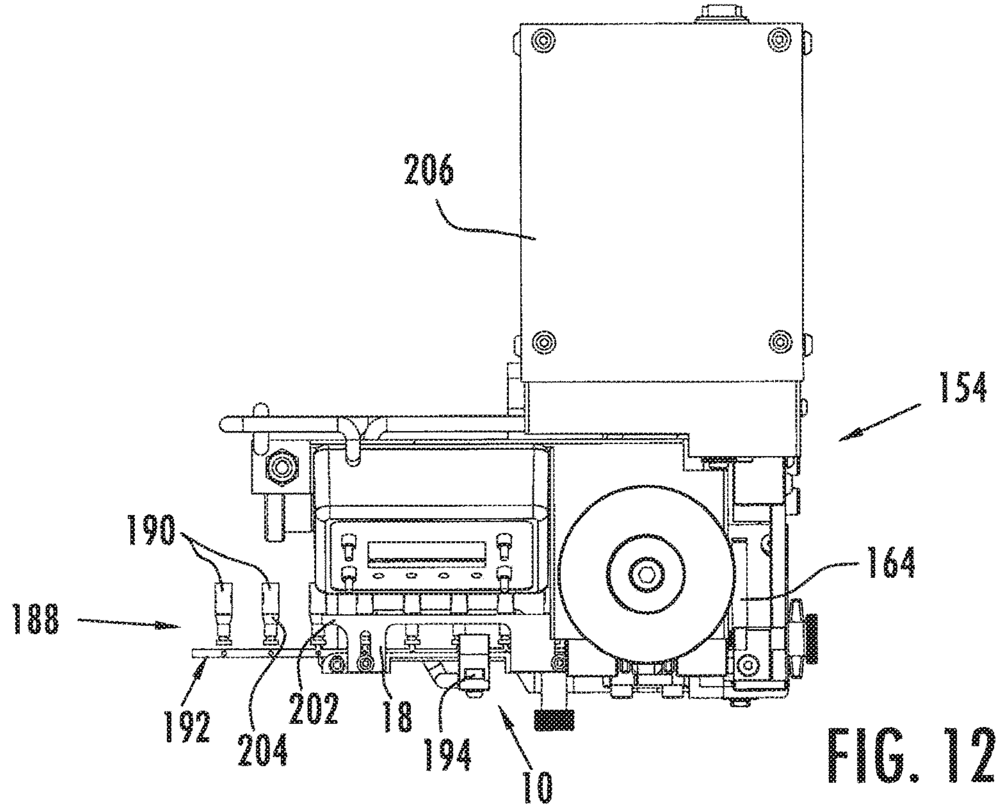
FIG. 12 is a top plan view of the assembly of FIG. 11.

Referring to FIG. 12, each of the electrical terminals 190 can include an alignment recess 204 which aligns with the flange end 202 of rail 78 to guide the plurality of electrical terminals 190. Die 154 can also include an electrical control box 206 which provides electrical control circuitry for electrical programming of die operation.

Figure 13:
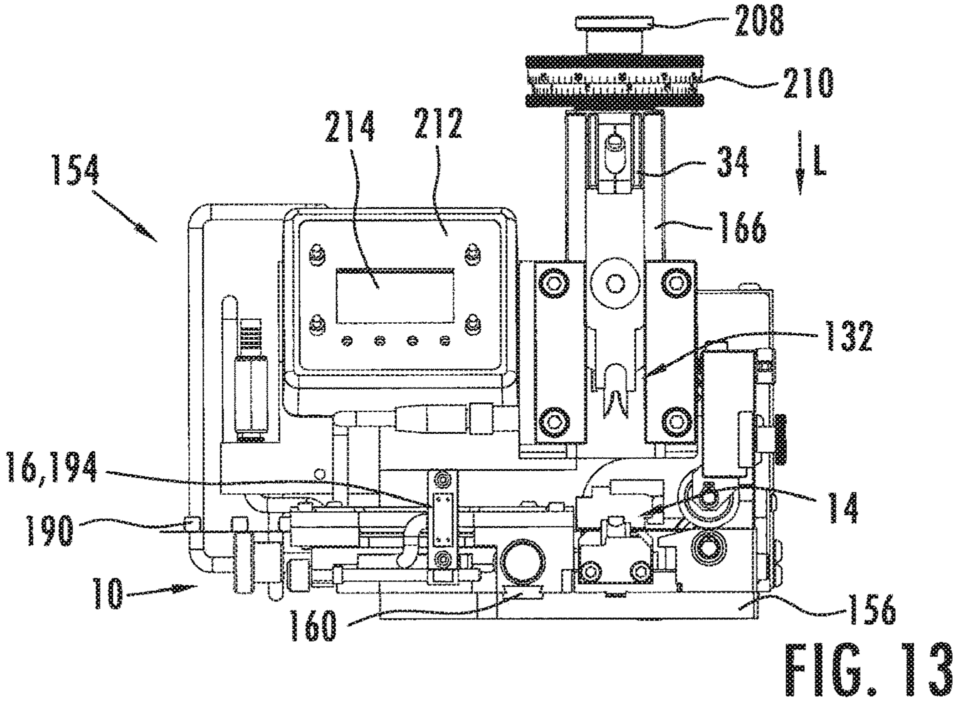
FIG. 13 is a front elevational view of the assembly of FIG. 11.

Referring to FIG. 13 and again to FIG. 12, a force transfer member 208 connected to ram 134 receives the force created by a press (shown and described in reference to FIGS. 20, 21) to drive ram 134 in a downward driving direction “L”. A rotary adjustment device 210 can be provided to adjust a vertical position of upper tool assembly 132 with respect to tool assembly 14. According to several embodiments, an electronic readout device 212 having a digital or analog readout screen 214 can be mounted to die 154 which provides visual output data on multiple criteria, including but not limited to quantity and type of electrical terminals 190, terminal feed rate, press operating conditions, and the like. Electronic readout device 212 can also be connected to and receive output data from sensor 194. In these embodiments, an electrical lead (not shown) connecting sensor 194 to electronic readout device 212 is first disconnected to remove feed guide and tool support assembly 10 from die 154. For several embodiments, male dovetail member 160 is shown which as previously noted is used to align feed guide and tool support assembly 10 on die platen 156.

Figure 14:
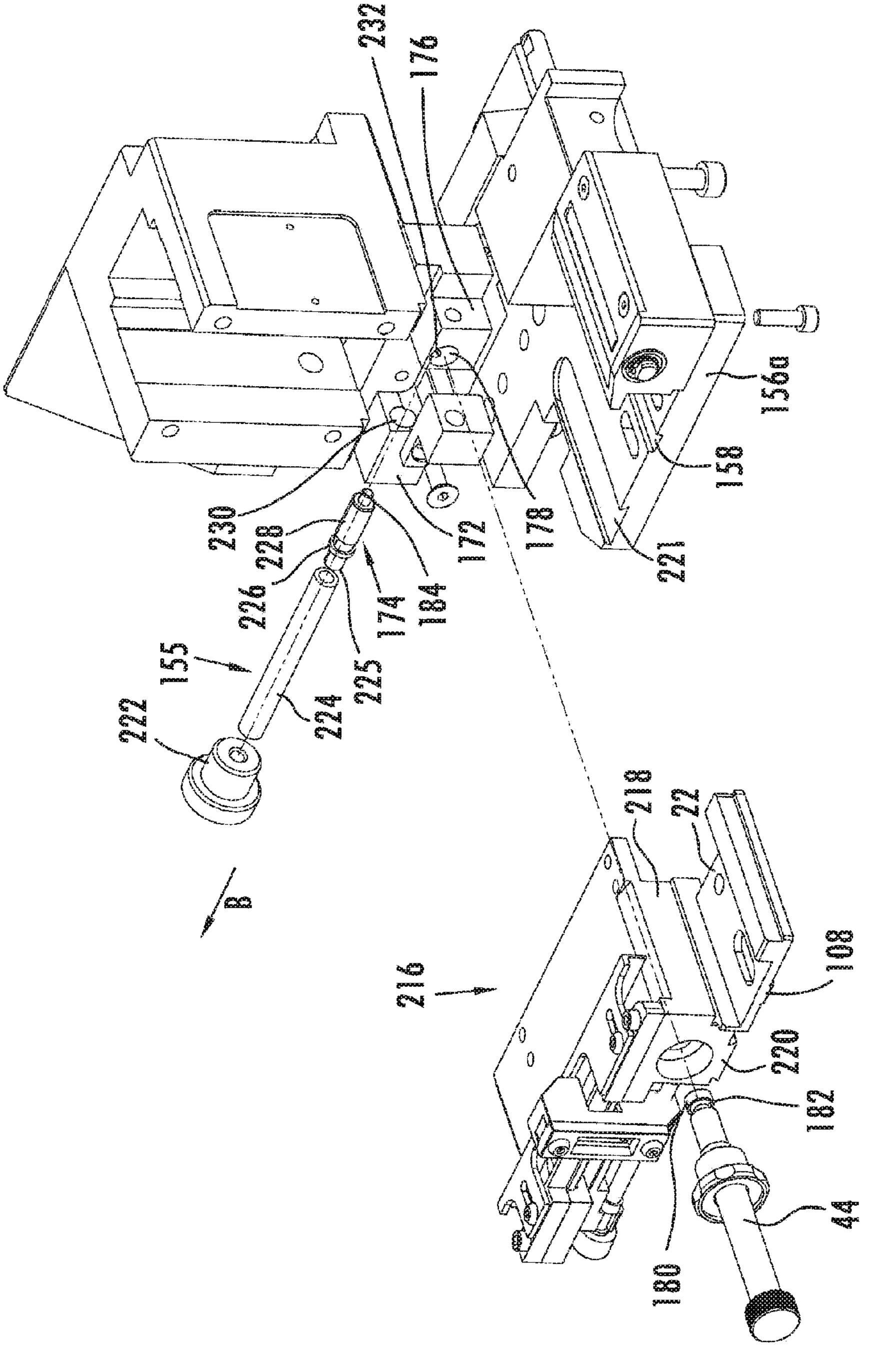
FIG. 14 is a left front perspective assembly view of another embodiment of a feed guide and tool support assembly and die.

Referring to FIG. 14, according to other embodiments, a feed guide and tool support assembly 216 is modified from feed guide and tool support assembly 10 to include an adjustment device receiving portion 218 having a male dovetail pin 220 extending therefrom, which is slidably mated with a female dovetail slot 221 in a modified die platen 156*a*. This embodiment continues use of male key member 108 which is slidably received in female slot 158 of die platen 156*a*. The terminal head 180 and reduced diameter portion 182 features of adjustment device 44 are also more clearly depicted in FIG. 14.

With further reference to FIG. 14 and again to FIG. 10, single fastener 155 can be assembled from multiple component parts, such as a grip knob 222 and a tubular body 224. Threaded body portion 174 can include a male tubular portion 225 inserted into tubular body 224, a flange 226, and a threaded portion 228 having tapered male extending pin 184 axially extending therefrom. Threaded portion 228 mates with a female threaded aperture 230 of first apertured block 172. Tapered male extending pin 184 slidably extends through and beyond a pin receiving bore 232 of second apertured block 176. Pin receiving bore 232 is oriented substantially transverse to alignment aperture 178 of second apertured block 176. When grip knob 222 is pulled in the pin release direction "B", male extending pin 184 is retracted from reduced diameter portion 182 of adjustment device 44 to permit removal of feed guide and tool support assembly 216 (and similarly to remove feed guide and tool support assembly 10).

Figure 15:
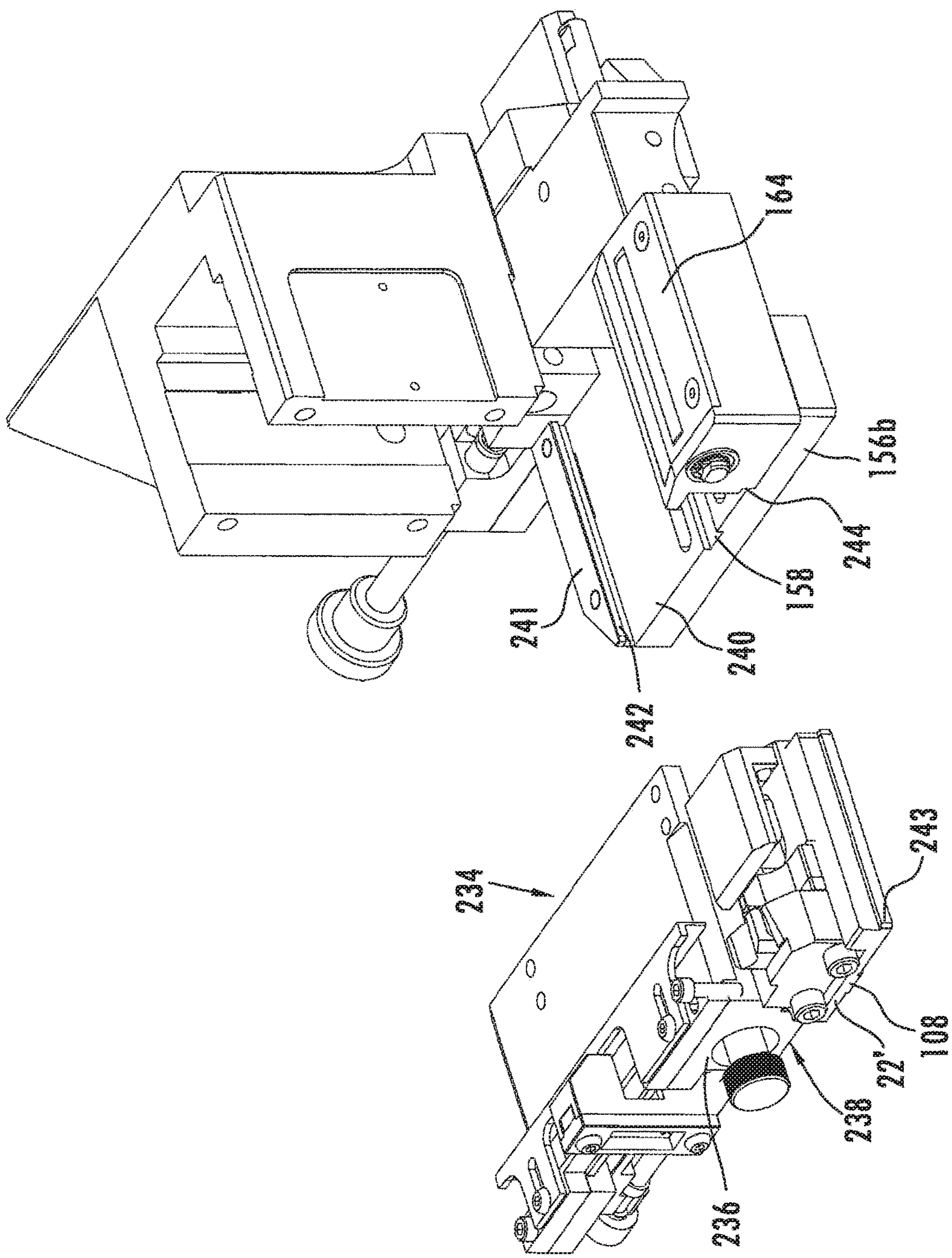
FIG. 15 is a front perspective assembly view of another embodiment of a feed guide and tool support assembly and die.

Referring to FIG. 15, according to further embodiments, a feed guide and tool support assembly 234 is modified from feed guide and tool support assembly 10 to provide an adjustment device receiving portion 236 having a substantially flat engagement portion 238 slidably engaged on a flat receiving portion 240 of a modified die platen 156*b*. An alignment member 241 can be fastenably connected to die platen 156*b*. Alignment member 241 includes a male extending flange 242 facing female slot 158. A male tongue 243 extending from tool receiving portion 22' is slidably received in a female groove 244 created in a body portion of off-load alignment member 164 to provide vertical retention of feed guide and tool support assembly 234 on flat receiving portion of modified die platen 156*b*.

Figure 16:
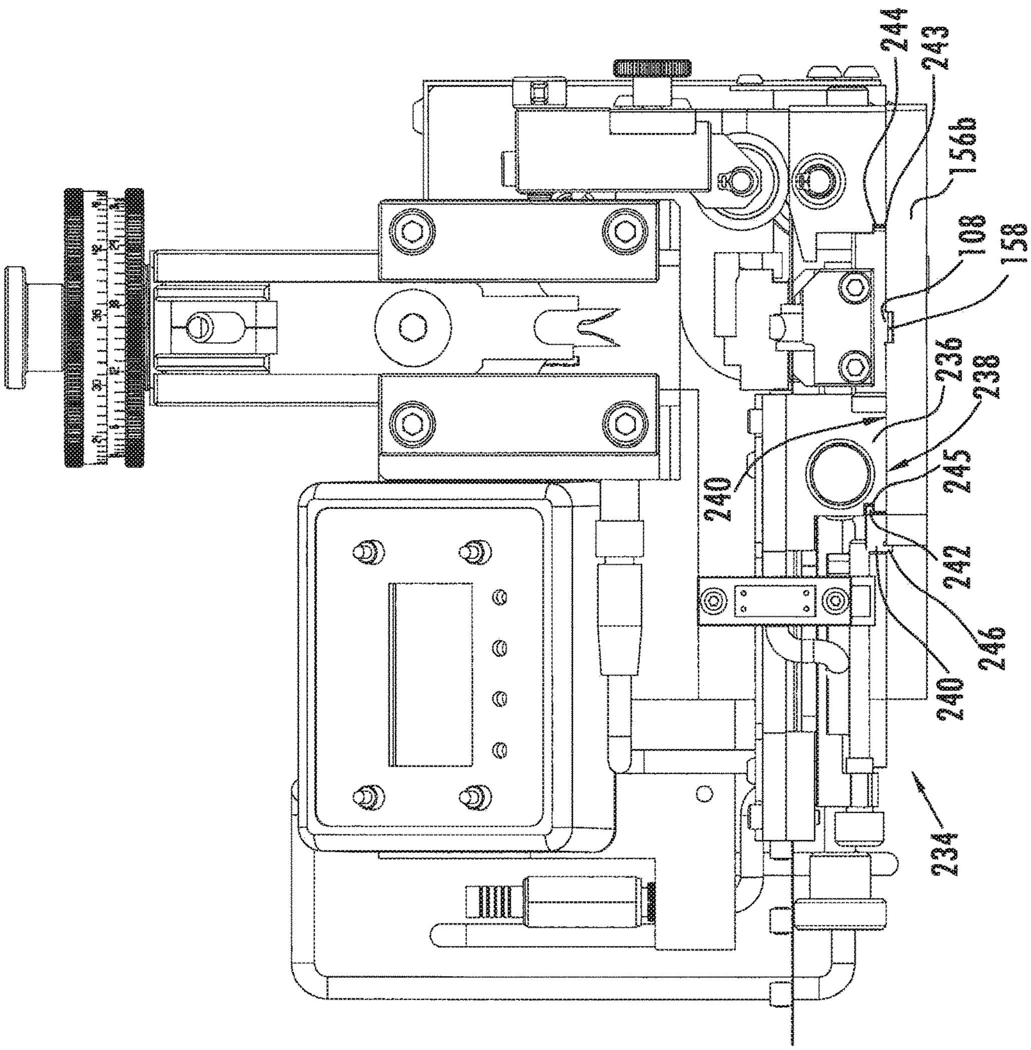
FIG. 16 is a front elevational view of an assembled feed guide and tool support assembly and die of FIG. 15.

Referring to FIG. 16, feed guide and tool support assembly 234 is shown mounted to die platen 156*b* having male extending flange 242 slidably received in a longitudinal slot 245 created in adjustment device receiving portion 236 and male key member 108 slidably received in female slot 158. Engagement portion 238 is in sliding contact with receiving portion 240. To further engage receiving portion 240 with die platen 156*b*, a male key 246 extending from receiving portion 240 is slidably inserted in a slot created in die platen 156*b*.

Figure 17:
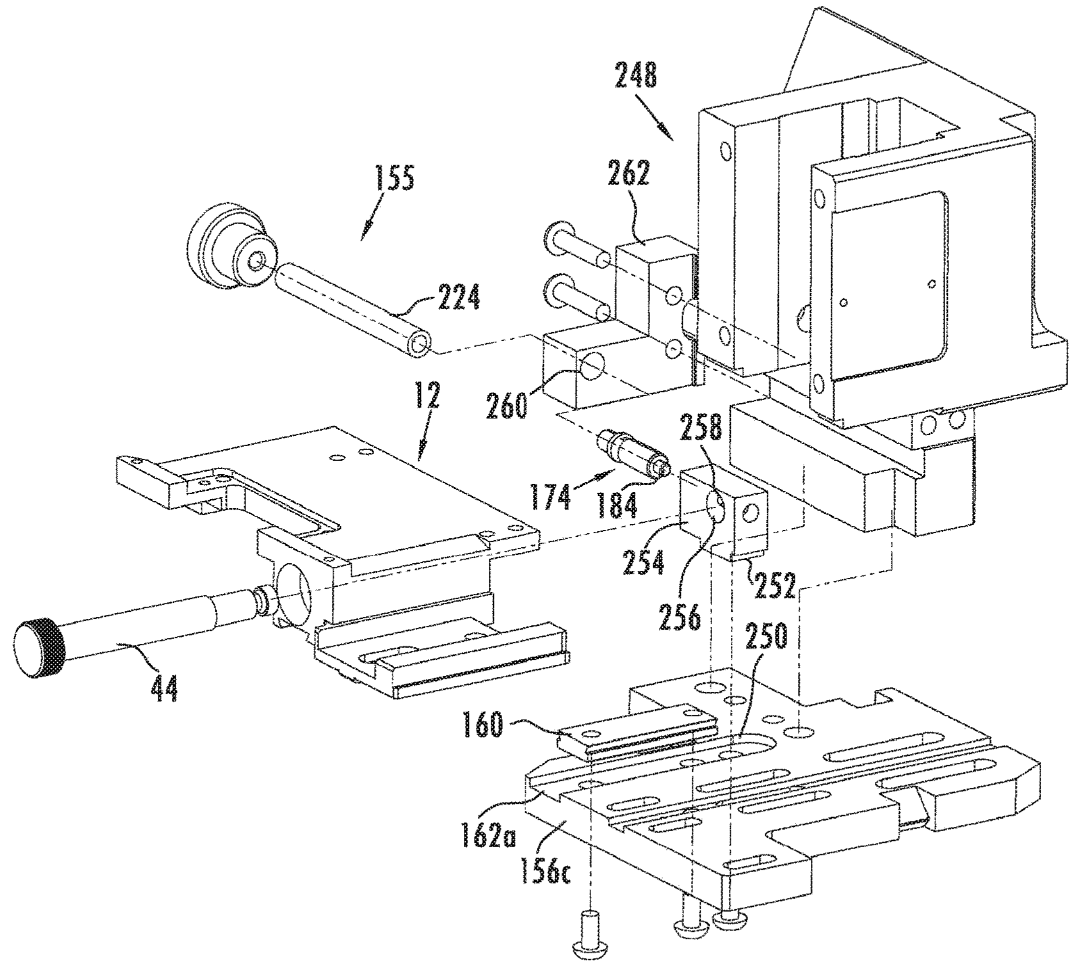
FIG. 17 is a left front perspective view of another embodiment of a feed guide and tool support assembly and die.

Referring to FIG. 17, a ram alignment member 248 is connected to a further modified die platen 156*c* having a modified female slot 162*a* lengthened at a slot end 250. A key member 252 of a third apertured block 254 is slidably received in modified female slot 162*a* at slot end 250. Third apertured block 254 is then fastened to modified die platen 156*c*. Adjustment device 44 is slidably received in an aperture 256 of third apertured block 254. The tapered male extending pin 184 extending from threaded body portion 174 is slidably received through a pin aperture 258 to engage adjustment device 44 as previously described herein in reference to FIG. 10. The threaded portion 228 of single fastener 155 is threadably received in a female threaded aperture 260 of a fourth apertured block 262 which is fastened to ram alignment member 248. The use of third and fourth apertured blocks 254, 262 provides increased flexibility in locating and adjusting the position of one-piece member 12.

Referring to FIG. 18 and again to FIGS. 10 and 14, the threaded body portion 174 is shown having male extending pin 184 in its normally biased extended position, partially extending outwardly from threaded portion 228. A biasing member 264 such as a tension spring normally biases male tubular portion 225, flange 226 and male extending pin 184 in the first direction "A". In the normally biased extended position of male extending pin 184, a rectangular shaped member 266 connected to flange 226 is partially received in a slot 268 created in an unthreaded sleeve portion 270 which is connected to threaded portion 228. In the normally biased extended position, male extending pin 184 is received in reduced diameter portion 182 of adjustment device 44, which engages feed guide and tool support assembly 10 to die platen 156 of die 154.

Figure 18:
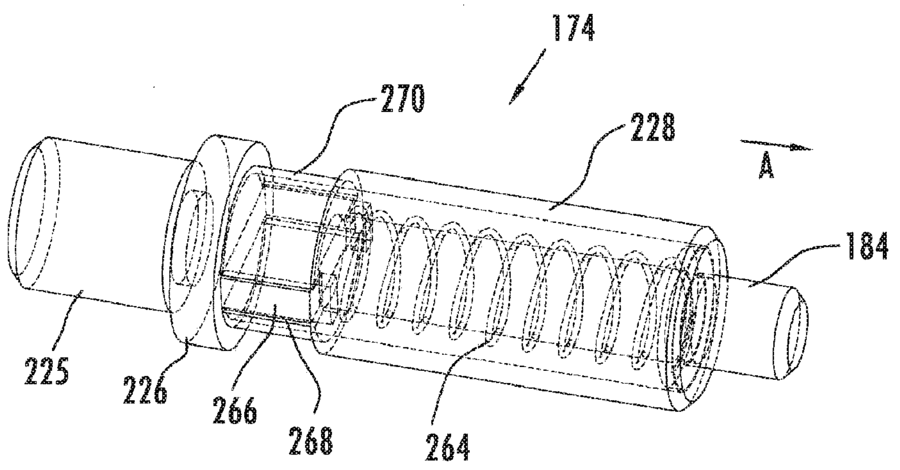
FIG. 18 is a front perspective view of a spring biased tapered pin assembly of the present disclosure with the tapered pin in its normally outward biased extended position.

Referring to FIG. 19 and again to FIGS. 10, 14 and 18, single fastener 155 can be a spring biased quick release sliding pin. To release male extending pin 184 from reduced diameter portion 182 of adjustment device 44, and therefore permit removal of feed guide and tool support assembly 10 from die 154, single fastener 155 is pulled in the release direction "B" which moves male tubular portion 225, flange 226 and male extending pin 184 in the release direction "B" relative to threaded portion 228 until male extending pin 184 is retracted through a pin positioning aperture 272 into an inner cavity 278 of threaded portion 228. A tension force is thereby created in biasing member 264. When rectangular shaped member 266 is clear of slot 268, tubular portion 225 can be axially rotated (for example approximately 90 degrees) from the position shown so that an end face 274 of rectangular shaped member 266 will be biased into contact with a corresponding and oppositely directed second end face 276 of unthreaded sleeve portion 270 to hold male extending pin 184 within the inner cavity 278 of threaded portion 228. Feed guide and tool support assembly 10 can thereafter be removed from die 154.

Figure 19:
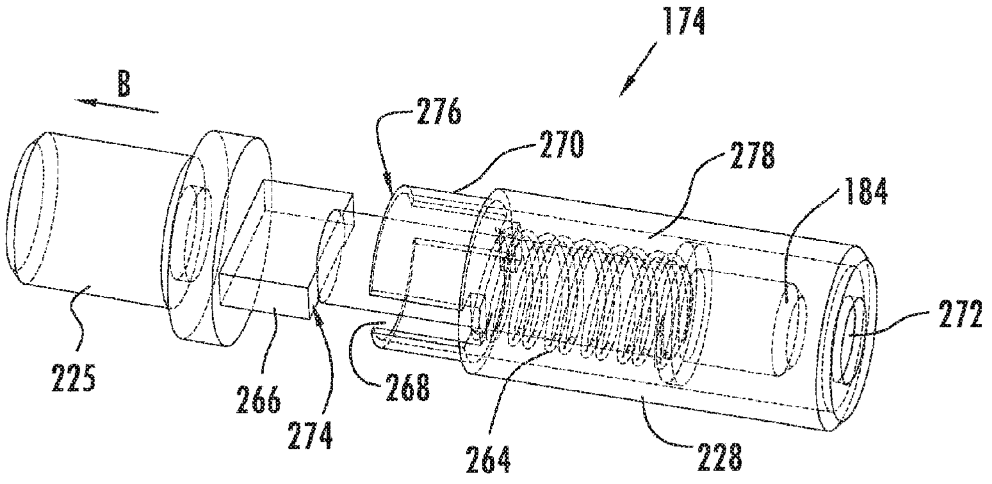
FIG. 19 is a front perspective view of the spring biased tapered pin assembly of FIG. 18 showing the tapered pin in a retracted position.

After a replacement feed guide and tool support assembly 10 is mounted on die platen 156 of die 154, (or one of the other embodiments discussed herein) single fastener 155 including tubular portion 225 can be axially rotated (for example approximately 90 degrees) to realign rectangular shaped member 266 with slot 268 as shown in FIG. 19. The biasing force of biasing member 264 will bias male extending pin 184 in the first direction "A" such that male extending pin 184 is axially extended as shown in FIG. 18 to again engage adjustment device 44 of the replacement feed guide and tool support assembly 10.

Figure 21:
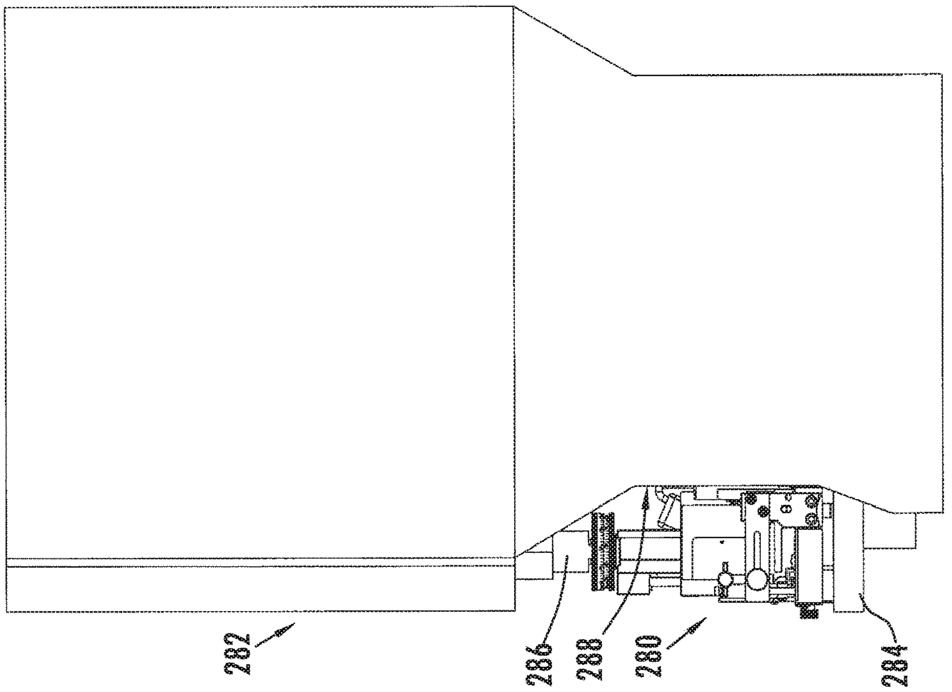
FIG. 21 is a side elevational view of the press of FIG. 20.
Figure 20:
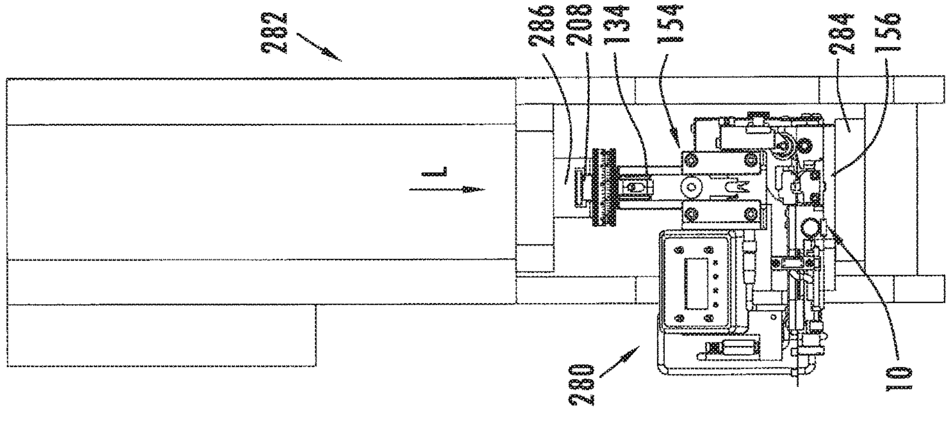
FIG. 20 is a front elevational view of an exemplary press having the tool assembly of the present disclosure.

Referring to FIGS. 20 and 21, a tool and die assembly 280 having feed guide and tool support assembly 10 connected to die 154 is shown mounted to a press 282. Die platen 156 is releasably fastened to a platen support plate 284 of press 282. A ram connecting member 286 is connected to force transfer member 208 to transfer the downward force of press 282 in the downward driving direction "L" to ram 134. A recessed frame wall 288 of press 282 can provide access to components and fasteners of tool and die assembly 280.

According to several embodiments, assembly of the feed guide and tool support assembly 10 can further include ram 134 connected to the die 154, and at least one punch 146,148 connected to the ram 134 and aligned with the at least one conductor anvil 54. The tool assembly 14 can include a insulation anvil 60 releasably fastened to the tool mount block 46, and a terminal straightener 70 adjustably positioned with respect to the conductor anvil 54 and releasably secured to the tool mount block 46. The plate portion 157 of the die 154 can have one of a male member (male dovetail member 160) extending therefrom or a female slot (female slot 162) created therein. The other one of the male members (as male dovetail pin 220) or the female slot (as female slot 102) is created in the one-piece member 12 such that the one-piece member 12 is slidably connected with the male member by a sliding fit between the male member and the female slot.

According to other embodiments, the male member (as male key member 108) is a dovetail shaped member created on the stock guide portion 20 and the female slot (as female slot 158) has a corresponding dovetail shape to receive the male dovetail shaped member. A male key member 108 can also be extended from the tool receiving portion 22 and slidably received in a key slot (modified from female slot 158 to a longitudinal slot) created in the plate portion 157 to further align the one-piece member 12 to the die 154. The stock guide portion 20 can further include homogeneously extending guide rail 30 to align terminal holder strip 188 holding multiple individual electrical terminals 190 with tool assembly 14 fastened to the tool receiving portion 22.

The feed guide and tool support assembly 10 can further include an axially rotatable adjustment device 44 threadably connected to the one-piece member 12 and connected to the die by the single fastener 155 to adjust a horizontal position of the one-piece member 12 by rotation of the rotatable adjustment device 44. The one-piece member 12 can be made as a homogeneous member, a non-releasable assembly of components, or directly connected components created for example as a casting of a metal material such as aluminum, steel, magnesium, or an alloy of materials, machined from a block or billet of material, or molded such as by casting or injection molding using a polymeric or composite material, with the stock guide portion 20 displaced or elevated with respect to the tool receiving portion 22 such that a terminal 190 slidably fed on the stock guide portion 20 aligns with a tool assembly 14 mounted on the tool receiving portion 22.

A sensor 194 such as but not limited to an optical sensor, a mechanical sensor, a light/beam sensor, an air sensor, or the like which identifies a part location can be connected to the stock guide portion 20 to provide indication of the passage of a next terminal 190' moving toward the tool receiving portion 22. The optical sensor 194 can also be removable together with one-piece member 12 when the single fastener 155 is released.

The term "homogeneous" (or homogeneously) as used herein is defined as a part, component, member, or the like (collectively the part) having all portions of the part formed of the same material and by the same process used to create the part, such as but not limited to molding including injection molding, or by forging or casting, such that no portion(s) of the part require connection to any other portion by a secondary process including but not limited to fastening, welding, adhesive bonding, mechanical connection, second molding or casting process, or the like, and the chemical properties of the part material are substantially equivalent throughout the part.

The term "non-releasable" (or non-releasably) as used herein is defined as two or more parts, components, members, or the like (collectively the part) having all portions of the part fixedly connected such as by welding, brazing, soldering, co-molding, riveting, or the like, preventing manual disassembly. The same or different materials can be used for the different parts. Use of releasable connectors such as threaded, pinned, or the like fasteners used to couple but not permanently join the parts are not included under the term "non-releasable".

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An electrical terminal applicator system, comprising: a die connected to a press;

a one-piece member including a stock guide portion homogeneously connected to a tool receiving portion, the one-piece member releasably secured to the die using a first fastener;

a male member extending from the one-piece member, and a female slot created in the die slidably receiving the male member to permit the one-piece member to be horizontally positioned on the die prior to securing the one-piece member using the first fastener; and a tool assembly having a tool mount block movable to a desired position, the tool assembly releasably secured to the tool receiving portion using a second fastener after positioning the tool assembly in the desired position.

2. The electrical terminal applicator system of claim 1, wherein the tool receiving portion includes at least one alignment surface oriented parallel with the male member and the female slot, the tool mount block movable to a desired position by sliding contact with the least one alignment surface.

3. The electrical terminal applicator system of claim 2, wherein the at least one alignment surface of the tool receiving portion further includes a first alignment surface and a second alignment surface, the first and the second alignment surfaces providing a sliding fit for the tool mount block.

4. The electrical terminal applicator system of claim 3, wherein the tool mount block includes opposed parallel faces individually slidingly contacting one of the first or the second alignment faces of the tool receiving portion, the tool mount block thereby being slidably received between the first and the second alignment surfaces.

5. The electrical terminal applicator system of claim 1, wherein the tool assembly together with the one-piece member are connected to and releasable from the die as a sub-assembly using the first fastener.

6. The electrical terminal applicator system of claim 1, further including a mount fastener received though the tool mount block to releasably connect the tool assembly to the tool receiving portion.

7. The electrical terminal applicator system of claim 1, wherein the male member and the female slot each define complementary male and female dovetail-shapes.

8. The electrical terminal applicator system of claim 1, wherein the first fastener comprises a pin manually releasable from and insertable into engagement with the die to releasably engage the one-piece member with the die.

* * * * *